United States Patent [19]

Andy et al.

[11] Patent Number: 4,744,700

[45] Date of Patent: May 17, 1988

[54] METHOD FOR FILLING ABANDONED MINES

[75] Inventors: Albert Andy, Washington, Pa.; John H. Beale, Medfield, Mass.

[73] Assignee: Washington Penn Plastic Co., Washington, Pa.

[21] Appl. No.: 17,999

[22] Filed: Feb. 24, 1987

[51] Int. Cl.⁴ .......................... E02D 3/12; E04B 1/16
[52] U.S. Cl. .................... 405/264; 405/267; 264/31; 264/DIG. 7; 299/11
[58] Field of Search ............. 405/258, 263, 264, 267, 405/288; 299/11, 12; 166/295; 264/31, 45.3, DIG. 7

[56] References Cited

U.S. PATENT DOCUMENTS

| | | | |
|---|---|---|---|
| 2,958,905 | 11/1960 | Newberg et al. | 264/DIG. 7 X |
| 3,021,291 | 2/1962 | Thiessen | 264/DIG. 7 X |
| 3,379,253 | 4/1968 | Chism | 166/295 |
| 3,478,520 | 11/1968 | Andy | 405/264 |
| 3,509,079 | 4/1970 | Hyde et al. | 264/DIG. 7 X |
| 3,637,019 | 1/1972 | Lee | 166/295 |
| 3,736,758 | 6/1973 | Dolfing et al. | 405/264 |
| 3,836,617 | 9/1974 | Lankheet | 264/DIG. 7 X |
| 3,855,049 | 12/1974 | Klein | 264/DIG. 7 X |
| 3,878,686 | 4/1975 | Hageman et al. | 405/264 |
| 3,892,442 | 7/1975 | Janssen | 405/264 X |
| 4,114,382 | 9/1978 | Kubens et al. | 405/264 |
| 4,614,754 | 9/1986 | Christman | 405/288 X |

OTHER PUBLICATIONS

Graham, Donald L., "A New Low Density Molding Material," SPE Journal, Oct. 1957.

*Primary Examiner*—David H. Corbin
*Assistant Examiner*—John A. Ricci
*Attorney, Agent, or Firm*—William J. Ruano

[57] ABSTRACT

A method of completely filling mines and underground cavities in such a way as to reinforce the strata and ground thereabove in order to prevent collapse or subsidence. The method comprises introduction into mines and cavities, expandable plastic materials which are incorporated into a chemically catalysed foam reaction and strongly bonded thereby. The heat required to expand foamable plastic materials many-fold is provided by the chemically exothermic polymerization reaction of polymeric isocyanate with polyols and epoxides by basic catalysis which promotes highly exothermic urethane/isocyanurate polymer formation in the presence of suitable blowing agents and surfactants.

6 Claims, No Drawings

METHOD FOR FILLING ABANDONED MINES

This invention relates to a method for filling abandoned mines and is an improvement over that disclosed by one of the present inventors, Albert Andy, in U.S. Pat. No. 3,478,520, dated Nov. 18, 1969.

BACKGROUND OF THE INVENTION

Mine cavities were filled in the above-mentioned Andy patent by expandable polystyrene by applying sufficient heat thereto in the cavity or mine to cause expansion, such as by propane gas to supply a burner, steam heated pipes or electric heating coils energized by electrical supply lines.

SUMMARY OF THE INVENTION

An object of the present invention is to fill abandoned mines and other cavities with an expandable material which can be expanded without the necessity of electrical heating coils, steam heated pipes, or propane gas introduced to supply a burner adjacent the granular expandable plastic material, such as required in the above-mentioned Andy patent.

A more specific object of the invention is to provide previously expanded polystyrene foamed beads or unexpanded pentane-containing polystyrene beads which are bonded and/or expanded by the exothermic heat of reaction of an isocyanate/polyol/expoxide system catalyzed by strong bases, such as DMP-30 and potassium octoate.

DESCRIPTION OF THE PREFERRED EMBODIMENTS

Aside from the above-mentioned improvements over said Andy patent, another advantage of the present invention is that the incorporation of other pre-expanded materials than foamed or expandable polystyrene is possible. Other low density and compression-resistant foamed materials that may be inexpensively available could be used, such as scrap rigid urethane, vinyl or phenolic foams. A particular advantage is realized if syntactic glass beads are used. In this way a very low combustability foamed mass can be generated. In case of fire or spontaneous combustion of other materials present, the combined effect of high oxygen index of the urethane/isocyanurate foam and presence of non-combustible glass beads, suppression of fires is enhanced over the invention of the above mentioned Andy patent.

Specific examples of the chemistry involved in generating foams capable of expanding foamable polystyrene and/or bonding to previously foamed materials follow.

CELLULAR MATERIAL

The cellular material of the present invention is formed by reacting isocyanates polyols and possibly epoxides under catalytic basic conditions. In all cases herein cited there is a stoichiometric excess of isocyanate functionality which in turn reacts to form polymeric cyclic trimer, isocyanurate. This chemistry provides two advantages; the reactions are strongly exothermic, which supplies heat and promotes expansion of any unexpanded polystyrene beads present. Also secondly the resulting isocyanurate/urethane foam tends to be of low combustability which is a desirable feature in a mine or other underground cavity.

Further enhancement of exothermic heat has been found desirable and has been achieved by adding catalytic amounts of epoxy compounds. Epoxy compounds react with polyols in the presence of strong base by a strongly exothermic general base catalysis route. This drives the overall system temperature still higher, a further advantage of the present system chemistry.

Cellular material is formed during the polymerization reactions just described by adding a blowing agent and surfactant, as will be described hereinafter.

THE BLOWING AGENT

Any blowing agent characteristically employed in similar products can be employed in the compositions of the present invention.

In general, these blowing agents are liquids at ambient conditions and have atmospheric presure boiling points between $-50°$ C. and $100°$ C. and preferably between $0°$ C. and $50°$ C. The preferred liquids are hydrocarbons or halocarbons.

Examples of suitable blowing agents include, among others, chlorinated and fluorinated hydrocarbons such as trichlorofluoromethane $[FCl_3C](F-11)$ 1,2-difluoro 1,1,2,2, tetrachloroethane, $[(FCl_2)C—C(Cl_2F)](F-112)$, 1,1,2-trichloro-1,2,2-trifluoroethane $[FCl_2C—C ClF_2](F-113)$, 1,1-dichloro-tetrafluoroethane$[FCl_2C—CF_3](F-115)$, diethyl ether, n-pentane, cyclopentane, 2-methyl butane are preferred blowing agents. Blowing agents are utilized in an amount sufficient to give the resultant foam, containing other expanded materials, a bulk density in the desired range of 1.5 to 12 pounds per cubic foot, depending on the compressive strength required. The preferred range of bulk density is between 2 and 5 pounds per cubic foot.

The blowing agent generally comprises from 5 to 30% and preferably from 8 to 20% by weight of the composition. In the case of trichlorofluoromethane, which has a boiling point near ambient temperature, the blowing agent is predissolved in cool ($18°$ C.) polyisocyanate before mixing with polyols and catalyst.

THE SURFACTANT

Successful results have been obtained with polysiloxane/ethylene oxide/propylene oxide copolymers such as are available from Union Carbide Corporation, General Electric Corporation and Dow Corning Corporation.

The surfactant generally comprises from 0.05 to 10 and preferably comprises from 0.10 to 5 weight percent of the foam composition, exclusive of added cellular materials which are not polymerized herein at the same time.

Other surfactants successfully used for urethane/isocyanurate foam synthesis may also be successfully employed.

EXAMPLE 1

This example is illustrative of the present invention. The following ingredients are combined in the quantities shown in Table 1.

TABLE 1

| | | Master Batch Composition | |
|---|---|---|---|
| Item | Identity | Weight (g.) | Gram-equivalents |
| A | PAPI-20[a] | 149 | a.b $\times 10^{-1}$ isocyanate |
| B | Freon R-11[b] | 28 | — |
| C | L-5340[c] | 3.2 | — |
| D | Diethylene glycol | 23[d] | 4.34 $\times 10^{-1}$ hydroxyl |

TABLE 1-continued

| | | Master Batch Composition | |
|---|---|---|---|
| Item | Identity | Weight (g.) | Gram-equivalents |
| E | Catalyst | Varied[d] | $0.5 \times 10^{-1}$ hydroxyl |

Catalyst is 1 g. DMP-30, Rohm and Haas Co.

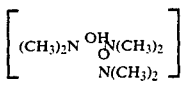

3 g. potassium octoate solution (HEX-CEM 97). This is a 75% solution of potassium octoate in diethylene glycol; supplied by Mooney Chemicals, Cleveland Ohio.
32 g. Catalyst solution contains
1 g. DMP-30
3 g. K-octoate solution
23 g. Diethylene glycol
5 g. Polyethylene glycol 200
[a]Product of Dow Chemical, polymethylene polyphenyl isocyanate, a 50/50 (w/w) mixture of diphenylmethane diisocyanate and higher polymers.
[b]Trichlorofluoromethane, E. I. duPont Co.
[c]Product of Union Carbide, described in text.
[d]Cyclic isocyanurate predicted is 20.2% or slightly less at high catalyst level.

Components D and E are combined for the experiments that follow. Components A, B, C were premixed in a wide mouthed screw cap glass bottle with a paint mixer paddle inserted in the chuck of a variable speed drill and then cooled to 10°–15° C.

Components D and E were premixed to give weight of catalyst as indicated below in Table 2. Mixing was conducted in a well-ventilated hood by adding diol, polyol and catalyst (D & E) to a 1-quart Dixie cup containing A, B, C which were well mixed with the paint stirrer in a variable speed drill. After 15 seconds mixing the mass was poured into a $12 \times 12 \times 4''$ cake box and observed for foam rise, foam density and strength. Temperature was measured in the center of the foaming mass.

TABLE 2

Exotherm and Foam Density. Co-expansion of Pentane-containing Polystyrene Beads

| Experiment No. | Cat. Wt. (See Table 1) | Added Polystyrene Beads[a] (w/w %) | Exotherm °F. | Foam Density pcf[b] | % of possible expansion |
|---|---|---|---|---|---|
| 1 | 35 | — | 278 | 2 | — |
| 2 | 17 | — | 260 | 3 | — |
| 3 | 17 | 12 | 235 | 3 | 100 |
| 4 | 25 | 12 | 240 | 3 | 100 |

[a]Polystyrene beads D40B Arco Chemical Co.
[b]Pounds per cubic foot

Original styrene bead diameter was 0.8 mm. Final diameter of the beads excised from the completely cured foam was an average of 2.8 mm. This is the same diameter as observed by independently heating the beads on a microscope hot stage to 220°–260° F. and observing thermal expansion. This represents a 43-fold increase in volume [f($r^3$)] for a full expansion. This was achieved in experiments 3 and 4 of Table 2, example 1.

EXAMPLE 2

This example is illustrative of the present invention. In the expectation of driving the exothermic reaction to an even higher temperature than seen in Example 1, epoxy compounds were used to effect as shown in Table 3, below. The blowing agent was changed to F-113, 1,1,2-trichloro-1,2,2-tri fluoroethane in all experiments in table 3 (5–12) and also all subsequent examples.

TABLE 3

Exotherm and Foam Density. Co-expansion of Pentane-Containing Polystyrene Beads

| Expt. No. | Cat. wt. (See Tbl. 1) | Added Polystyrene Beads[a] wt. % | Added Epoxy Material,[c] g. | Exotherm °F. | Foam Density (pcf) | % Expansion of Beads |
|---|---|---|---|---|---|---|
| 5 | 35 | — | 1.5 | 282 | 5.1 | — |
| 6 | 35 | 48 | 6.5 | 176 | 10.0 | ~5 |
| 7 | 35 | 48 | 11.5 | 179 | 9.7 | ~5 |
| 8 | 35 | 57 | 11.5 | 168 | 13.0 | ~5 |
| 9 | 16 | 48 | 1.5 | 133 | poor foam | — |
| 10 | 32 | 48 | 1.5 | 171 | 9.8 | ~5 |
| 11 | 35 | 48 | 1.5 | 187 | 4.7 | ~25 |
| 12 | 40 | 48 | 1.5 | 177 | 7.4 | ~5 |

[a]Polystyrene beads D40B.
[c]4-vinyl cyclohexene dioxide, Polysciences, Inc.

Master batch weight of isocyanate, Freon and surfactant is 180 g. in all cases. This is as shown in A, B, C of Table 1.

Foams in both Examples 1 and 2 (Tables 2 and 3) took about 15–30 seconds to begin rising. That is the time from mixing until a glossy appearance overcame the fluid surface and the mass began to expand.

Time until the foams were firm to the touch was between one minute for a typical case to four minutes for the slowest case (Example 2, Number 9, Table 3). The peak exotherm time occurred between five and ten minutes.

Comparison of Experiment 1 of Table 2 and Experiment 5 of Table 3 show the positive effect of using an epoxy compound to drive the exotherm to higher temperatures (282° F. compared to 278° F.). Recall that the low boiling F-11 was used in Table 2 examples and F-113 in all subsequent ones. Further F-113 has a 14% higher specific heat in the vapor state. See also Experiments Numbers 13 and 14 in Table 4. (Exotherms are 220° and 257° F., respectively. F-113 was used in both experiments 13 and 14.

TABLE 3

This example is illustrative of the present invention. Additional amounts of catalyst solution and added epoxy compound and varied Freon-113 level were used to control temperature and also foam density with added expandable polystyrene. These results are presented as Table 4.

TABLE 4

Exotherm and Foam Density. Co-expansion of expandable polystyrene beads. Effect of added epoxy compounds.

| Expt. No. | Cat. Wt. (Tbl. 1) g. | Added Polystyrene Beads wt. % | Epoxy Material g. | Exotherm (°F.) | Foam Density (pcf) | % expansion of beads |
|---|---|---|---|---|---|---|
| 13 | 16 | — | — | 220 | n.d. | 0 |
| 14 | 16 | — | 15 | 257 | n.d. | 0 |
| 15 | 32 | 31 | 15 | 202 | 6 | ~30 |
| 16 | 45 | 30 | 15 | 219 | 4.2 | 100 |
| 17 | 45 | 30 | 25 | 231 | 3.7 | 100 |
| 18[a] | 45 | 30 | 25 | 224 | 2.3 | 100 |

[a] An additional 28 g. (100% increase) of Freon 113 was added.

Trichlorfluoromethane was substituted by 1,1,2-trichloro-1,2,2-trifluoromethane (R-113). Master batch weight was 180 g. (same as Tables 1, 2 and 3).

Thus, it will be seen that we have provided a novel method and expandable or expanded plastic composition for filling abandoned mine and other cavities without the necessity of providing electrical heating coils, steam heated pipes or propane gas to heat a burner adjacent granular expandable plastic material. Also we have provided a novel expandable plastic composition having considerably greater strength and expansion capabilities than heretofore possible to assure more complete filling of cavities and support of strata and ground above mine cavities and the like, also which is of lower combustability, a very desirable feature in mines.

While we have illustrated and described several embodiments of our invention, it will be understood that these are by way of illustration only and that various changes and modifications may be contemplated in my our invention and within the scope of the following claims:

We claim:

1. A method of completely filling mines and underground cavities, without applying external heat, to reinforce the strata and ground thereabove in order to prevent collapse or subsidence; comprising introducing, into said mines, a foamable plastic material, reacting therewith, polymeric isocynates with polyols and, additionally, with co-catalytic amounts of epoxides by general base and metal salt catalysis in the presence of blowing agents and surfactants, to promote unusually high exothermic urethane/isocyanurate polymer formation, whereby said foamable plastic material is expanded many-fold into a low combustible strongly reinforcing foam filler.

2. The method recited in claim 1 wherein said foamable plastic material is pentane-containing polystyrene beads.

3. The method recited in claim 1 wherein said foamable plastic material is pentane-filled polystyrene beads and previously expanded polystyrene.

4. The method recited in claim 1 wherein said blowing agents include chlorinated and fluorinated hydrocarbons.

5. The method recited in claim 1 wherein said blowing agents include trichlorofluormethane.

6. The method recited in claim 1 wherein said blowing agents include 1,1-dichloro-tetrafluoreothane [$FCl_2C-CF_3$].

* * * * *